(12) United States Patent
Han et al.

(10) Patent No.: US 11,779,935 B2
(45) Date of Patent: Oct. 10, 2023

(54) SLOW-RELEASE INHIBITOR FOR HIGH-MAGNESIUM SULFIDE MINERAL FLOTATION AND APPLICATION THEREOF

(71) Applicant: Central South University, Hunan (CN)

(72) Inventors: Haisheng Han, Hunan (CN); Wei Sun, Hunan (CN); Yuehua Hu, Hunan (CN); Ruolin Wang, Hunan (CN); Zhao Wei, Hunan (CN); Wenjuan Sun, Hunan (CN); Li Wang, Hunan (CN); Yue Yang, Hunan (CN); Honghu Tang, Hunan (CN); Qingpeng Zhang, Hunan (CN); Lei Sun, Hunan (CN)

(73) Assignee: Central South University, Changsha (CN)

( * ) Notice: Subject to any disclaimer, the term of this patent is extended or adjusted under 35 U.S.C. 154(b) by 889 days.

(21) Appl. No.: 16/693,186

(22) Filed: Nov. 22, 2019

(65) Prior Publication Data
US 2020/0324300 A1     Oct. 15, 2020

(30) Foreign Application Priority Data

Apr. 10, 2019 (CN) .......................... 201910282585.3

(51) Int. Cl.
*B03D 1/002* (2006.01)
*B03D 1/02* (2006.01)
(Continued)

(52) U.S. Cl.
CPC ............. *B03D 1/002* (2013.01); *B03D 1/018* (2013.01); *B03D 1/02* (2013.01); *C01F 11/22* (2013.01);
(Continued)

(58) Field of Classification Search
CPC .......... B03D 1/002; B03D 1/018; B03D 1/02; B03D 1/08; B03D 1/12; B03D 1/14; B03D 2201/06; B03D 2203/02
See application file for complete search history.

(56) References Cited

U.S. PATENT DOCUMENTS

| 2,492,936 A | * | 12/1949 | Nokes | ..................... | B03D 1/002 |
| | | | | | 209/901 |
| 3,480,143 A | * | 11/1969 | Mitzmager | ............ | B03D 1/014 |
| | | | | | 209/166 |

(Continued)

FOREIGN PATENT DOCUMENTS

| BR | PI0505911 B1 * | 5/2016 | ............. B03D 1/002 |
| CN | 86108113 A | 5/1987 | |

(Continued)

OTHER PUBLICATIONS

Ruolin Wang; "Fluorite particles as a novel calcite recovery depressant in scheelite flotation using Pb-BHA complexes as collectors", Minerals Engineering; Dec. 8, 2018.

*Primary Examiner* — Joseph C Rodriguez

(57) ABSTRACT

Disclosed are a slow-release inhibitor for high-magnesium sulfide mineral flotation and an application thereof, where the inhibitor is a nano colloidal particle of an alkaline earth fluoride such as $CaF_2$ and $BaF_2$ or a highly-reactive natural alkaline earth metal mineral powder. When applied to the flotation separation of a high-magnesium sulfide ore, the inhibitor can slowly release F ions to preferentially form a $MgF_2$ layer on the magnesium-containing mineral surface, which provides a structure similar to $MgF_2$ on a surface of oxidized gangue minerals such as magnesium oxide, changing surface electrical property of the magnesium-containing mineral, inhibiting heterogeneous coagulation of magnesium-containing minerals and sulfide ores due to electrostatic attraction and reducing entrainment, enveloping and (Continued)

agglomeration of gangue minerals to efficiently inhibit the flotation of oxidized gangue minerals such as magnesium oxide.

9 Claims, 3 Drawing Sheets

(51) Int. Cl.
 *B03D 1/018* (2006.01)
 *C01F 11/22* (2006.01)

(52) U.S. Cl.
 CPC ...... *B03D 2201/06* (2013.01); *B03D 2203/02* (2013.01)

(56) References Cited

U.S. PATENT DOCUMENTS

| | | | |
|---|---|---|---|
| 3,910,836 A | 10/1975 | Soquem | |
| 4,157,296 A * | 6/1979 | Dorrepaal | B03D 1/016 209/167 |
| 2009/0301972 A1 * | 12/2009 | Hines | C04B 40/0039 210/705 |

FOREIGN PATENT DOCUMENTS

| | | |
|---|---|---|
| CN | 102218376 A | 10/2011 |
| CN | 104874484 A | 9/2015 |
| CN | 105214850 A | 1/2016 |
| CN | 107597444 A | 1/2018 |
| CN | 107694764 A | 2/2018 |
| CN | 109821662 A | 5/2019 |

* cited by examiner

SLOW-RELEASE INHIBITOR FOR HIGH-MAGNESIUM SULFIDE MINERAL FLOTATION AND APPLICATION THEREOF

CROSS-REFERENCE TO RELATED APPLICATIONS

This application claims the benefit of priority from Chinese Patent Application No. 201910282585.3, filed on Apr. 10, 2019. The content of the aforementioned application, including any intervening amendments thereto, is incorporated herein by reference in its entirety.

TECHNICAL FIELD

The application relates to a magnesium-containing mineral inhibitor for mineral processing, and more particularly to a slow-release inhibitor for high-magnesium sulfide mineral flotation and an application thereof in the flotation separation of a metal sulfide ore, such as nickel, cobalt and copper ores, and a gangue mineral such as magnesium oxide.

BACKGROUND OF THE INVENTION

Nickel is an indispensable raw material for military and civil industries, which plays an extremely important role in the national economy. Currently, there are mainly three kinds of nickel deposits exploited in the world, including laterite nickel ores, nickel sulfide ores and weathering-crust nickel silicate ores, and the seabed ferromanganese nodules are the nickel ores to be exploited, where the laterite nickel ore accounts for 55%, the nickel sulfide ore accounts for 28% and the other nickel ores account for about 17%. In China, the nickel deposit is predominated by nickel sulfide ore, which contributes nearly ⅔ of the nickel materials. However, most nickel sulfide deposits are associated with various elements such as copper, cobalt, gold, silver, platinum, palladium, osmium, ruthenium, iridium, rhodium and etc., where Jinchuan nickel-cobalt-copper deposit is one of the most representative ores. Therefore, how to achieve the high-efficiency separation of a sulfide ore of nickel, cobalt or copper has been widely concerned for a long time. Flotation is commonly used in the separation of a sulfide ore, where the agents especially collectors and inhibitors, play a vital role in ensuring the separation effect. Commonly-used collectors for nickel-cobalt-copper sulfide ores mainly include ionic collectors represented by xanthate and dithiophosphate, non-ionic collectors represented by sulfur-nitrogen compounds and other collectors represented by diphenyl thiourea and mercaptan. Commonly-used nickel-cobalt-copper sulfide ore inhibitors mainly include sodium silicate, sodium sulfide, sodium hexametaphosphate, CMC and modified starch. However, it has been demonstrated that it is difficult to achieve high-efficiency separation and enrichment with a traditional collector and inhibitor. Moreover, the magnesium-containing gangue minerals, such as magnesium oxide, in the nickel-cobalt-copper sulfide ores have a fine particle size, and are contrary to the nickel-cobalt-copper sulfide ores in surface electrical property, which will easily lead to the generation of electrostatic attraction, and further result in the occurrence of entrainment, enveloping, agglomeration, coagulation, making it difficult to achieve a desired flotation separation result. Therefore, it is of great significance to develop a novel collector and an inhibitor to improve the flotation separation of a nickel-cobalt-copper sulfide ore.

SUMMARY OF THE INVENTION

One object of the invention is to provide a solid inhibitor to solve the above-mentioned problems in the prior art that since magnesium-containing gangue minerals such as magnesium oxide have a fine particle size and an opposite electrical property to the surface of nickel-cobalt-copper sulfide ore, electrostatic attraction is easy to occur therebetween, which results in the occurrence of entrainment, enveloping, agglomeration and coagulation, making it difficult to achieve a desired flotation separation result. The inhibitor provide herein is able to slowly release fluorine in a high-magnesium sulfide ore flotation system and shows a strong selectivity to magnesium oxide gangue minerals, effectively inhibiting the flotation of the magnesium oxide gangue minerals.

The other object of this invention is to provide an application of the slow-release inhibitor for high-magnesium sulfide mineral flotation in the flotation separation of the nickel-cobalt-copper sulfide ore or the like and the magnesium oxide gangue minerals, where the inhibitor can selectively inhibit the flotation of gangue minerals such as magnesium oxide and improve the concentrate grade and recovery rate of the nickel-cobalt-copper sulfide ore, achieving the high-efficiency flotation separation of the sulfide ore and magnesium oxide.

To achieve the above-mentioned objects, the invention provides a slow-release inhibitor for high-magnesium sulfide mineral flotation, which comprises an alkaline earth fluoride.

The alkaline earth fluoride contained in the inhibitor of the invention is a slightly-soluble mineral, and is able to slowly release reactive fluoride ions in an ore pulp system, where the reactive fluoride ions can preferentially react with the reactive magnesium ions on a surface of magnesium oxide to form a magnesium fluoride layer on a surface of an oxidized ore, so that the surface electrical property of magnesium oxide is changed to reduce the occurrence of the entrainment, enveloping and agglomeration in the sulfide ore due to electrostatic attraction, inhibiting the surface activity and the flotation of the magnesium oxide and improving the flotation separation of the sulfide ore and the magnesium-containing gangues.

In some embodiments, the alkaline earth metal fluoride is in a form of a nano alkaline earth metal fluoride colloidal particle and/or natural alkaline earth metal mineral. The natural alkaline earth metal minerals comprise fluorite concentrate.

In some embodiments, the nano alkaline earth fluoride colloidal particle is prepared by hydrothermally reacting a surfactant solution with the alkaline earth fluoride.

In some embodiments, the natural alkaline earth metal mineral has a particle size of less than 2 μm.

In some embodiments, the hydrothermal reaction is performed at a temperature of 80-300° C. and a pressure of 2-15 MPa for 0.5-3 h.

The invention further provides an application of the slow-release inhibitor for high-magnesium sulfide mineral flotation, comprising:

applying the slow-release inhibitor as a magnesium-containing mineral inhibitor in the flotation separation of a high-magnesium sulfide ore.

In some embodiments, the high-magnesium sulfide ore comprises at least one magnesium-containing gangue mineral from magnesite, serpentine, talc, olivine, pyroxene, hornblende, biotite, chlorite, vermiculite, montmorillonite and illite, and at least one metal sulfide ore from nickel sulfide mineral, cobalt sulfide mineral and copper sulfide mineral.

In some embodiments, the step of "applying the slow-release inhibitor as a magnesium-containing mineral inhibitor in the flotation separation of a high-magnesium sulfide ore" comprises the steps of:

directly mixing and pulping a nano alkaline earth fluoride colloidal particle with the high-magnesium sulfide mineral to generate an ore pulp, or mixing a natural alkaline earth metal mineral with the high-magnesium sulfide mineral; reacting the reaction mixture under strong stirring to produce an ore pulp; and introducing a conventional collector for the flotation separation.

In some embodiments, a mass ratio of the nano alkaline earth fluoride colloidal particle or the natural alkaline earth metal mineral to the high-magnesium sulfide mineral is preferably 1:10-500, more preferably 1:50-200 and most preferably 1:100. Normally, gangue minerals comprise a small amount of fluorite, which can be fully utilized as an inhibitor of high-magnesium gangues, appropriately reducing an amount of the slow-release inhibitor for high-magnesium sulfide mineral flotation externally added. For example, 1.0 kg/t slow-release inhibitor for high-magnesium sulfide mineral flotation relative to a raw ore is employed, when the raw ore comprises a certain amount of fluorite, an amount of the fluorite as an inhibitor is significantly reduced.

In some embodiments, the strong stirring reaction is performed at 1,200-3,000 rpm for 5-30 min, which promotes a full reaction of fluorides such as $CaF_2$ and $MgF_2$ with the high-magnesium sulfide mineral. Preferably, the stirring rate is 1,200-2,000 rpm and the stirring time of 10-30 min.

In some embodiments, a pulping time is 5-30 min. Prolonging the pulping time is advantageous to form a magnesium fluoride layer on a surface of the magnesium-containing gangue minerals; a preferred pulping time is 10-30 min.

In some embodiments, a concentration of the ore pulp in the flotation is controlled at 30%-40%, a pH of the flotation system is controlled to 7-9.

In some embodiments, the nano alkaline earth fluoride colloidal particle or the natural alkaline earth metal mineral is used in combination with at least one of acidified sodium silicate, sodium hexametaphosphate, starch and tannin, which provides better inhibitory effect than that the nano alkaline earth fluoride colloidal particle or the natural alkaline earth metal mineral alone do.

Based on the technical solutions of the invention, fluorite and gangue minerals associated or mixed in an ore are fully converted on the magnesium oxide surface by prolonging the pulping time to inhibit the flotation of magnesium-containing minerals such as magnesium oxide.

The collector employed in the flotation of the invention may be a conventional flotation agent in the prior art for the metal sulfide ore such as copper sulfide, cobalt sulfide and nickel sulfide, and the flotation is also performed by a conventional method.

In the invention, reactive fluoride ions slowly released from the nano alkaline earth metal fluoride colloidal particles or the natural alkaline earth metal minerals by strong stirring are absorbed by a surface of the magnesium-containing mineral and react with reactive magnesium ions on the surface of magnesium oxide to form a magnesium fluoride layer on the surface of the magnesium-containing mineral, which changes the surface electrical property of the magnesium-containing mineral via surface conversion, allowing the magnesium-containing mineral to share the same electrical charge property with the sulfide ore and weakening an electrostatic attraction therebetween.

It has been demonstrated by a large number of researches that natural pure fluorite minerals and nano alkaline earth metal fluoride colloids have a high reactivity respectively under the strong stirring and in the ore pulp, and the fluorite can release reactive fluoride ions and can also be deposited on the surface of minerals via adsorption during the dynamic dissolution in the ore pulp. In addition, the fluoride ions are able to react with reactive magnesium ions on the surface of magnesium oxide and the adsorption effect for the fluoride ions varies among different mineral surfaces, specifically, compared to the metal sulfide ores, fluoride ions are more likely to be absorbed by the surface of gangue minerals such as magnesium oxide to form a magnesium fluoride layer, which enables the magnesium-containing gangue minerals to have a structure similar to fluorite, changing the surface composition, surface electrical property and hydrophilicity of the magnesium oxide minerals to achieve the same surface electrical property with the nickel-copper sulfide ore. Electrostatic repulsion is subsequently generated to weaken the entrainment, agglomeration and enveloping of the magnesium oxide on the surface of the sulfide ore and inhibit the adsorption effect of the flotation agent. Given the above, the invention employs the nano alkaline earth metal fluoride colloidal particle or the natural alkaline earth metal mineral as a inhibitor for the flotation of magnesium-containing minerals. Due to the strong selectivity and high inhibitory effect, the inhibitor of the invention is able to achieve the high-efficiency separation and enrichment of gangue minerals such as magnesium oxide and sulfide ores.

Compared with the prior art, the invention have the following beneficial effects.

1. The inhibitor provided herein can be prepared from fluorite, which is a natural ore and is free of toxicity and pollution. Moreover, the fluorite is easy to obtain at a low cost and has simple preparation process, and thus it is suitable for the industrial production. The nano alkaline earth metal fluoride colloidal particle can also be readily synthesized at low cost, facilitating the large-scale production and application.
2. The slow-release inhibitor for high-magnesium sulfide mineral flotation of the invention is capable of strongly and selectively inhibiting gangue minerals such as magnesium oxide and basically fails to inhibit sulfide ores, enabling the high-efficiency flotation and separation of nickel, cobalt or copper sulfide ores and gangue minerals such as magnesium oxide.
3. The invention also fully utilizes the fluorite gangue minerals actually associated in an ore to inhibit the flotation of magnesium oxide, which fully uses the waste, greatly reducing the agent cost.

DETAILED DESCRIPTION OF EMBODIMENTS

The invention will be further illustrated below with reference to the embodiments, and is not limited thereto.

Example 1

Figure 1:
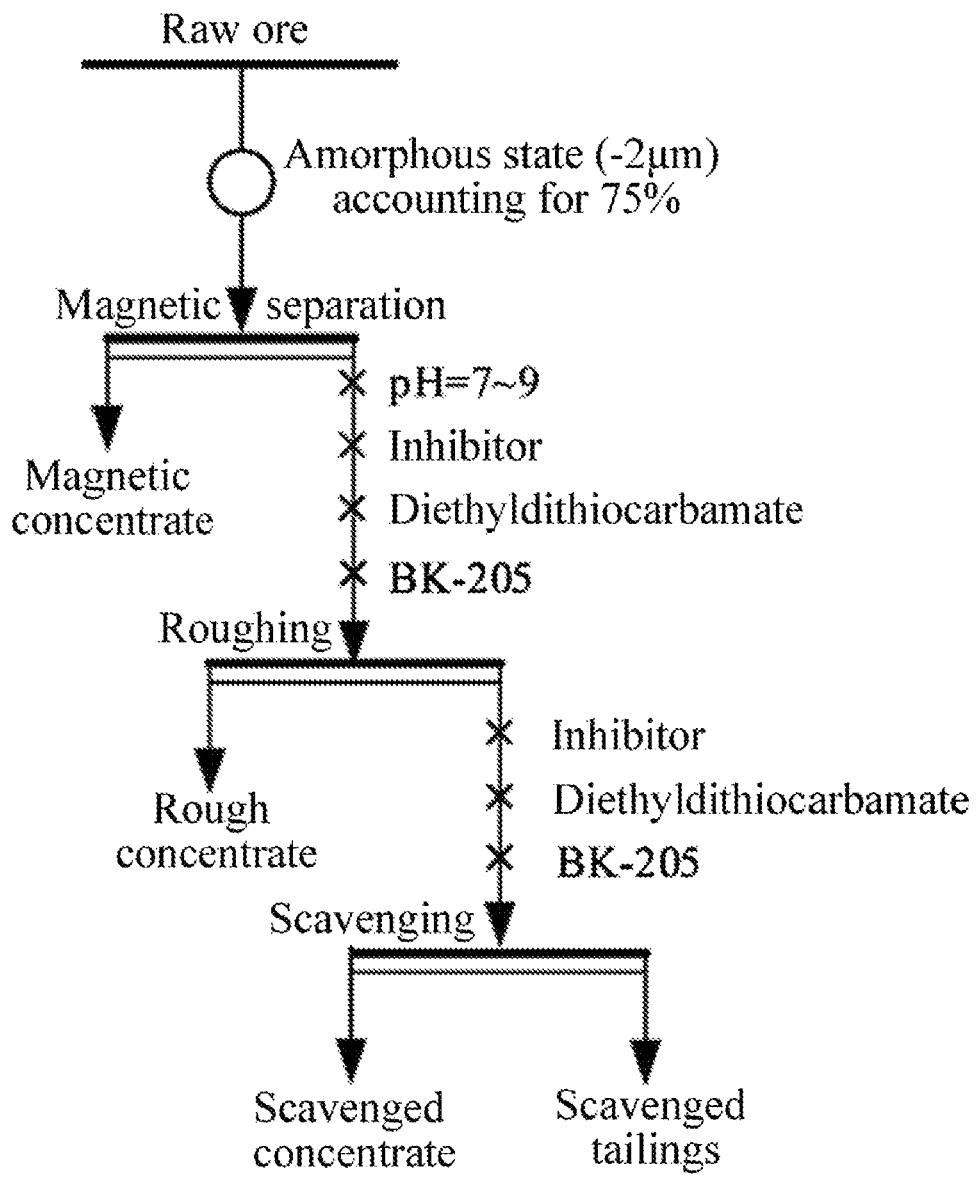
FIG. 1 is a flow chart showing the mineral processing according to a first embodiment of the invention.

Naturally pure fluorite minerals were ground to amorphous state (−2 μm) for the flotation of a nickel-copper sulfide ore. The multi-element analysis results of the nickel-copper sulfide ore were shown in Table 1, and it can be observed that gangue minerals of the ore mainly included oxides such as MgO, SiO₂ and Al₂O₃. As shown in FIG. 1, an ore dressing method including a combination of grinding, magnetic separation, one roughing and one scavenging was employed herein according to characteristics of the ore, where diethyldithiocarbamate was used as a collector, a natural fluorite particle with an amorphous surface was used as an inhibitor, and BK205 was used as a foaming agent. After added with the inhibitor, the flotation system was pulped under stirring at 1,500 rpm for 10 min. After the flotation separation, a grade and a recovery rate of concentrate nickel were 4.24% and 73.21%, respectively; a grade and a recovery rate of concentrate copper were 0.82% and 69.13%, respectively; and a grade of magnesium oxide in the concentrate was significantly reduced to 3.37%. Therefore, based on the above process, the flotation separation of the nickel-copper sulfide ore and magnesium oxide was achieved.

TABLE 1

| Multi-element analysis of a raw sulfide ore | | | | | | | | |
|---|---|---|---|---|---|---|---|---|
| Element | Ni | Cu | Co | Fe | S | MgO | SiO₂ | Al₂O₃ |
| Content (%) | 0.63 | 0.14 | 0.03 | 7.75 | 3.60 | 23.95 | 42.82 | 2.17 |

In order to verify the significance of the stirring time after the addition of the inhibitor, comparative tests merely varying in stirring times were carried out, and the results were shown in Table 2. It can be concluded that a shorter stirring time will lead to incomplete dissolution of the amorphous pure mineral inhibitor and surface conversion reaction, resulting in poor inhibition and low recovery rate. In the case that the stirring time reached 10 min, the recovery rates of nickel and copper overall tended to be stable with some small fluctuations.

TABLE 2

| Testing results at different stirring time | | | | | |
|---|---|---|---|---|---|
| Time (min) | 3 | 5 | 10 | 15 | 30 |
| Nickel recovery rate (%) | 52.13 | 66.45 | 73.21 | 74.36 | 74.02 |
| Copper recover rate (%) | 46.55 | 59.34 | 69.13 | 69.75 | 70.17 |

Example 2

Figure 2:
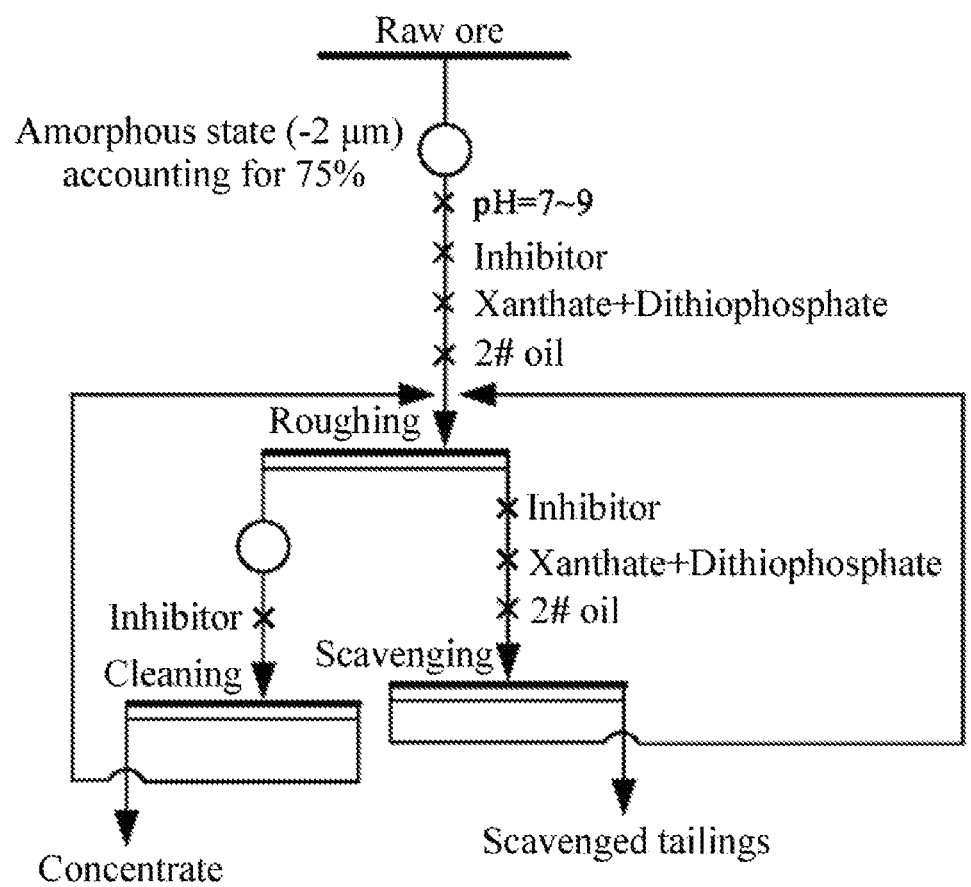
FIG. 2 is a flow chart showing the mineral processing according to a second embodiment of the invention.

30 g of calcite fluoride and 20 g of sodium oleate were added to 100 mL of water and reacted at 150° C. and 10 MPa in a high-pressure reactor for 1 h to produce a nano colloid inhibitor for the flotation of a raw ore in Jinchuan No. 1 mining area. The raw ore was subjected to a mineral processing sequentially including a grinding, one roughing and one scavenging to produce a rough concentrate, which was then treated by re-grinding and re-beneficiation. Grades of nickel, copper and magnesium oxide before and after the mineral processing were shown in Table 3. A combination of xanthate and dithiophosphate was used as a flotation collector, the nano calcium fluoride colloid was used as an inhibitor, and 2# oil was used as a foaming agent. After added with the inhibitor, the flotation system was stirred at 1,600 rpm for 5 min. It can be observed that through the mineral processing shown in FIG. 2, in the ore concentrate, the nickel grade was increased from 1.63% to 6.61% and the recovery rate of nickel reached 80.04%; the copper grade was increased from 0.91% to 2.86% and the recovery rate of copper reached 76.55%; while the magnesium oxide grade was reduced from 21.55% to 5.64%.

TABLE 3

| Analysis of a raw ore and ore concentrate in Jinchuan No. 1 mining area | | | |
|---|---|---|---|
| | Grade of raw ore (%) | Grade of ore concentrate (%) | Recovery rate % |
| Ni | 1.63 | 6.04 | 80.04 |
| Cu | 0.91 | 2.86 | 76.55 |
| MgO | 21.55 | 5.64 | — |

Example 3

Figure 3:
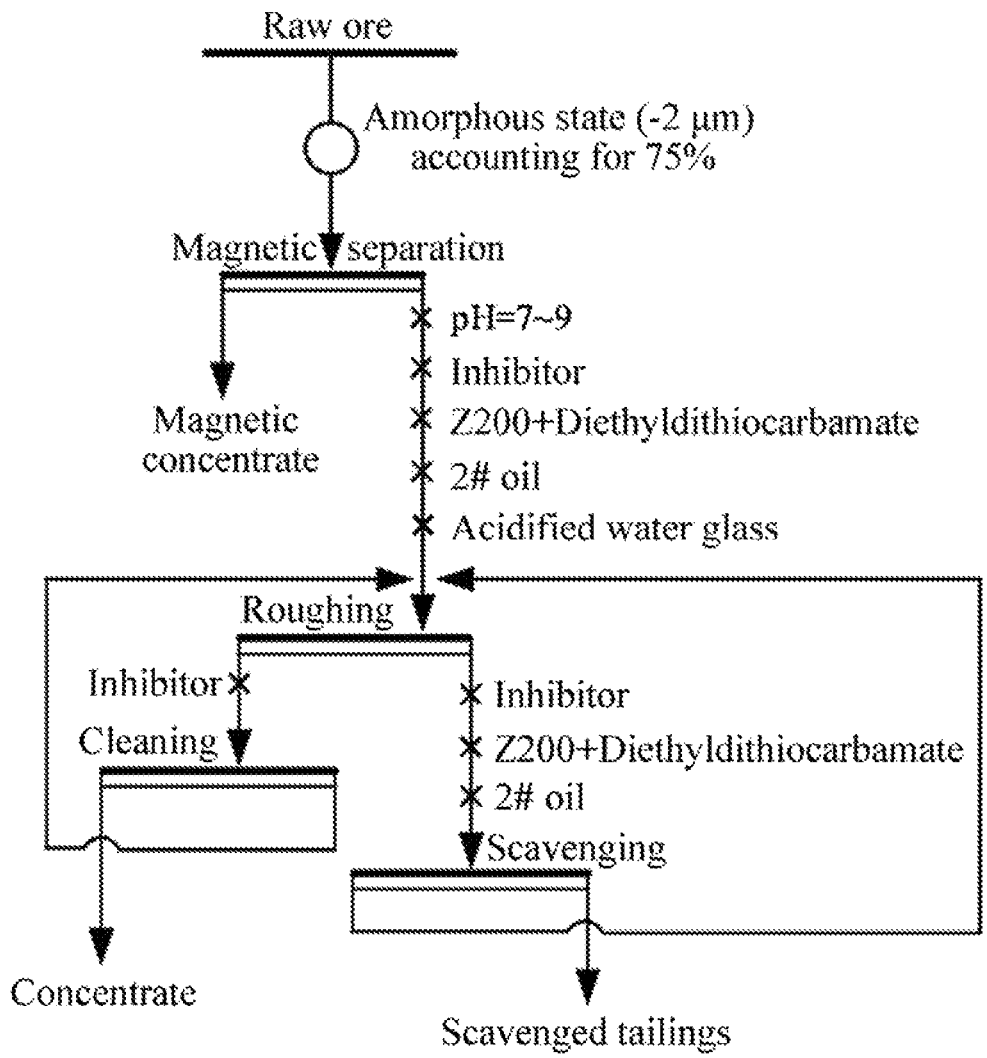
FIG. 3 is a flow chart showing the mineral processing according to a third embodiment of the invention.

20 g of barium fluoride and 10 g of sodium dodecyl sulfate were added to 50 mL of water and reacted at 200° C. and 10 MPa in a high-pressure reactor for 0.5 h to produce a nano colloid inhibitor for the flotation of a raw ore in Jinchuan No. 2 mining area. The component and multi-element analysis results of the raw ore were shown in Tables 4 and 5. A combination of Z-200 and diethyldithiocarbamate was employed as a collector, the nano barium fluoride colloid was used as the inhibitor, and 2# oil was used as a foaming agent. The flotation system was further added with acidified water glass. After added with the inhibitor, the flotation system was stirred at 1,500 rpm for 5 min. A sequentially closed-circuit mineral processing including a grinding, a magnetic separation, a roughing, a concentrating and a scavenging was employed and shown in FIG. 3. Using the collector and inhibitor, a grade and a recovery rate of concentrate nickel were 7.02% and 82.41%, respectively; a grade and a recovery rate of concentrate copper were 3.17% and 79.08%, respectively; a content of magnesium oxide in the ore concentrate was significantly reduced to 6.18%. Therefore, an effective flotation separation of sulfide ores such as nickel-copper sulfide and oxide ores such as magnesium oxide was achieved by the inhibitor in the invention.

TABLE 4

| Component analysis of a raw ore in Jinchuan No. 2 mining area | | | | | | |
|---|---|---|---|---|---|---|
| Mineral | Pyrrhotite | Pentlandite | Chalcopyrite | Valleriite | Pyrite | Serpentine | Olivine |
| Content % | 10.55 | 4.35 | 2.83 | 0.62 | 0.63 | 37.45 | 12.71 |
| Mineral | Pyroxene | Amphibole | Talc | Chlorite | Mica | Carbonate | Iron oxide |
| Content % | 16.26 | 4.73 | 0.96 | 1.85 | 0.82 | 0.97 | 5.21 |

TABLE 5

| Multi-element analysis of the raw ore in Jinchuan No. 2 mining area | | | | | | | |
|---|---|---|---|---|---|---|---|
| Element | Ni | Co | Cu | Fe | S | MgO | SiO$_2$ |
| Content % | 1.70 | 0.043 | 1.16 | 16.67 | 6.27 | 27.81 | 28.15 |

In order to further demonstrate the significant effect of the stirring strength on the function of the inhibitor, comparative tests merely varying in stirring strengths were carried out, and the results were shown in Table 6. It can be observed that the recovery rates of nickel and copper would be affected when the stirring intensity was too strong or too weak. As the stirring strength increased, the recovery rate was first increased and then decreased, and a peak value occurred at 1,500 rpm. The surface conversion would be incomplete when the stirring was too weak, while the inhibitor would be desorbed when the stirring was too strong, both of which had an effect on the flotation to a certain extent. Therefore, the slow-release inhibitor for the high-magnesium sulfide mineral flotation provided herein should be preferably employed in a certain range of stirring strength.

TABLE 6

| Testing results at different stirring strengths | | | | | |
|---|---|---|---|---|---|
| Stirring strength (rmp) | 1000 | 1200 | 1500 | 2000 | 3000 |
| Nickel recovery rate (%) | 64.89 | 75.58 | 82.41 | 80.94 | 72.33 |
| Copper recovery rate (%) | 60.73 | 71.37 | 79.08 | 76.25 | 67.19 |

What is claimed is:

1. A method of separating a high-magnesium sulfide ore, comprising:
    mixing alkaline earth metal fluoride in the form of a nano alkaline earth fluoride colloidal particle or in the form of a natural alkaline earth metal mineral with the high-magnesium sulfide mineral to produce an ore pulp;
    stirring the ore pulp under 1,200-3,000 rpm for 5-30 min; and
    introducing a collector to obtain a flotation system.

2. The method of claim 1, wherein a mass ratio of the nano alkaline earth fluoride colloidal particle or the natural alkaline earth metal mineral to the high-magnesium sulfide mineral is 1:10-500;
    and
    a pulping time is 5-30 min.

3. The method of claim 1, wherein a concentration of the ore pulp in the flotation is controlled at 30%-40%, and a pH of the flotation system is controlled to 7-9.

4. The method of claim 1, wherein the nano alkaline earth fluoride colloidal particle or the natural alkaline earth metal mineral is used in combination with at least one of acidified sodium silicate, sodium hexametaphosphate, starch and tannin.

5. The method of claim 1, wherein the collector is selected from the group consisting of copper sulfide, cobalt sulfide and nickel sulfide.

6. A method of separating a high-magnesium sulfide ore, comprising:
    mixing alkaline earth metal fluoride in the form of a nano alkaline earth fluoride colloidal particle or in the form of a natural alkaline earth metal mineral with the high-magnesium sulfide mineral to produce an ore pulp;
    stirring the ore pulp under 1,200-3,000 rpm for 5-30 min; and
    introducing a collector to obtain a flotation system;
    wherein the high-magnesium sulfide ore comprises at least one magnesium-containing gangue mineral selected from magnesite, serpentine, talc, olivine, pyroxene, hornblende, biotite, chlorite, vermiculite, montmorillonite and illite, and at least one metal sulfide ore selected from nickel sulfide mineral, cobalt sulfide mineral and copper sulfide mineral.

7. The method of claim 5, wherein a mass ratio of the nano alkaline earth fluoride colloidal particle or the natural alkaline earth metal mineral to the high-magnesium sulfide mineral is 1:10-500; and a pulping time is 5-30 min.

8. The method of claim 5, wherein the nano alkaline earth fluoride colloidal particle or the natural alkaline earth metal mineral is used in combination with at least one of acidified sodium silicate, sodium hexametaphosphate, starch and tannin.

9. The method of claim 6, wherein the collector is selected from the group consisting of copper sulfide, cobalt sulfide and nickel sulfide.

* * * * *